United States Patent
Stibel et al.

(10) Patent No.: US 8,955,154 B2
(45) Date of Patent: Feb. 10, 2015

(54) SINGLE SYSTEM FOR AUTHENTICATING ENTITIES ACROSS DIFFERENT THIRD PARTY PLATFORMS

(71) Applicant: Credibility Corp., Malibu, CA (US)

(72) Inventors: Jeffrey M. Stibel, Mailbu, CA (US); Chad Michael Buechler, Los Angeles, CA (US); Raymond Landgraf, Los Angeles, CA (US); Peter Delgrosso, Malibu, CA (US); Aaron B. Stibel, Malibu, CA (US)

(73) Assignee: Credibility Corp., Malibu, CA (US)

( * ) Notice: Subject to any disclaimer, the term of this patent is extended or adjusted under 35 U.S.C. 154(b) by 37 days.

(21) Appl. No.: 13/971,445

(22) Filed: Aug. 20, 2013

(65) Prior Publication Data
US 2013/0339141 A1 Dec. 19, 2013

Related U.S. Application Data

(63) Continuation-in-part of application No. 13/290,731, filed on Nov. 7, 2011, now Pat. No. 8,639,930, and a continuation-in-part of application No. 13/290,746, filed on Nov. 7, 2011, now Pat. No. 8,856,956.

(60) Provisional application No. 61/785,152, filed on Mar. 14, 2013, provisional application No. 61/505,738, filed on Jul. 8, 2011.

(51) Int. Cl.
*G06F 7/04* (2006.01)
*H04L 29/06* (2006.01)
(Continued)

(52) U.S. Cl.
CPC ............ *H04L 63/08* (2013.01); *G06Q 30/0251* (2013.01); *G06F 21/31* (2013.01);
(Continued)

(58) Field of Classification Search
CPC . H04L 63/083; H04L 63/08; H04L 2463/082; G06F 21/31
USPC .............................. 726/2, 5, 28; 713/168, 170
See application file for complete search history.

(56) References Cited

U.S. PATENT DOCUMENTS
5,872,917 A 2/1999 Hellmann
6,766,454 B1 7/2004 Riggins
(Continued)

OTHER PUBLICATIONS eBay's ID Verify, The Advantages of eBay's ID Verify, May 2004, Retrieved from the Internet <URL:auctionbytes.com/cab/abu/y204/m05/abu119/s03>, pp. 1-2 as printed.
(Continued)

*Primary Examiner* — Saleh Najjar
*Assistant Examiner* — Peiliang Pan
(74) *Attorney, Agent, or Firm* — Los Angeles Patent Group; Arman Katiraei

(57) ABSTRACT

Some embodiments provide an independent authentication system for authenticating entities that have registered accounts across different online service providers on behalf of the service providers. The authentication system maintains a database of previously verified entity information. A service provider requests authentication by providing the authentication system with unverified and basic identifying information used by an entity when registering with the service provider. The authentication system attempts to match the registration information against previously verified information for a known entity. When a match is found, the authentication system generates a series of challenge questions. The questions are submitted to the entity through the service provider and answers are processed in order to authenticate the entity. Authentication is thus provided on behalf of the service provider without the service provider accessing the previously verified information and without the service provider independently verifying the information within the generated challenge questions.

26 Claims, 11 Drawing Sheets

(51) Int. Cl.
   *G06Q 30/02*  (2012.01)
   *G06F 21/31*  (2013.01)
   *G06F 21/00*  (2013.01)
   *G06Q 10/10*  (2012.01)
   *G06Q 50/00*  (2012.01)
   *H04L 12/16*  (2006.01)

(52) U.S. Cl.
   CPC ........... *H04L2463/082* (2013.01); *G06F 21/00* (2013.01); *G06Q 10/107* (2013.01); *G06Q 50/01* (2013.01); *H04L 12/16* (2013.01); *G06Q 30/0207* (2013.01); *H04L 63/0815* (2013.01); *H04L 63/107* (2013.01)
   USPC ....................... 726/28; 726/2; 726/5; 713/170

(56) References Cited

U.S. PATENT DOCUMENTS

| | | | |
|---|---|---|---|
| 6,782,080 B2 | 8/2004 | Leivo et al. | |
| 6,789,193 B1 | 9/2004 | Heiden | |
| 7,013,286 B1 | 3/2006 | Aggarwal et al. | |
| 7,383,570 B2 | 6/2008 | Pinkas et al. | |
| 7,458,508 B1 | 12/2008 | Shao et al. | |
| 7,467,401 B2 | 12/2008 | Cicchitto et al. | |
| 8,090,351 B2 | 1/2012 | Klein | |
| 8,135,647 B2 | 3/2012 | Hammad et al. | |
| 8,239,677 B2 | 8/2012 | Colson | |
| 8,250,097 B2 | 8/2012 | Rhodes | |
| 8,255,318 B2 | 8/2012 | Royyuru | |
| 2002/0049806 A1 | 4/2002 | Gatz et al. | |
| 2003/0105966 A1 | 6/2003 | Pu et al. | |
| 2003/0126080 A1 | 7/2003 | Ogmen | |
| 2003/0212891 A1 | 11/2003 | Evans et al. | |
| 2004/0073814 A1* | 4/2004 | Miyazaki et al. | 713/202 |
| 2004/0117615 A1 | 6/2004 | O'Donnell et al. | |
| 2005/0071683 A1 | 3/2005 | Mizuguchi et al. | |
| 2005/0113067 A1* | 5/2005 | Marcovici et al. | 455/411 |
| 2005/0149740 A1* | 7/2005 | Kotzin et al. | 713/185 |
| 2005/0273442 A1 | 12/2005 | Bennett et al. | |
| 2006/0106738 A1 | 5/2006 | Schleicher | |
| 2006/0179304 A1 | 8/2006 | Han | |
| 2006/0294025 A1 | 12/2006 | Mengerink | |
| 2008/0028069 A1 | 1/2008 | Urbanek et al. | |
| 2008/0120507 A1 | 5/2008 | Shakkarwar | |
| 2008/0304458 A1 | 12/2008 | Aghvami et al. | |
| 2008/0319875 A1 | 12/2008 | Levchin et al. | |
| 2008/0319899 A1 | 12/2008 | Levchin et al. | |
| 2008/0319904 A1 | 12/2008 | Carlson et al. | |
| 2009/0089182 A1 | 4/2009 | Light et al. | |
| 2009/0132273 A1 | 5/2009 | Boesch | |
| 2009/0198686 A1 | 8/2009 | Cushman et al. | |
| 2009/0265773 A1* | 10/2009 | Schultz | 726/7 |
| 2010/0077048 A1 | 3/2010 | Czyzewicz et al. | |
| 2010/0114776 A1 | 5/2010 | Weller et al. | |
| 2010/0122330 A1 | 5/2010 | McMillan et al. | |
| 2010/0130172 A1 | 5/2010 | Vendrow et al. | |
| 2010/0131409 A1* | 5/2010 | Lawyer et al. | 705/44 |
| 2010/0198666 A1 | 8/2010 | Chiang et al. | |
| 2010/0229223 A1 | 9/2010 | Shepard et al. | |
| 2010/0255861 A1 | 10/2010 | Raviv et al. | |
| 2010/0313245 A1* | 12/2010 | Brandt et al. | 726/4 |
| 2011/0040592 A1 | 2/2011 | Kurtzig et al. | |
| 2011/0040662 A1 | 2/2011 | Kurtzig | |
| 2011/0040694 A1 | 2/2011 | Kurtzig et al. | |
| 2011/0041173 A1 | 2/2011 | Kurtzig et al. | |
| 2011/0047245 A1 | 2/2011 | Abramson et al. | |
| 2011/0055911 A1 | 3/2011 | Adelman et al. | |
| 2011/0072039 A1 | 3/2011 | Tayloe | |
| 2011/0087530 A1* | 4/2011 | Fordyce et al. | 705/14.17 |
| 2011/0087705 A1 | 4/2011 | Swink et al. | |
| 2011/0125770 A1 | 5/2011 | Battestini et al. | |
| 2011/0161444 A1 | 6/2011 | Chauhan | |
| 2011/0179378 A1 | 7/2011 | Wheeler et al. | |
| 2011/0202402 A1* | 8/2011 | Fowler et al. | 705/14.25 |
| 2011/0258024 A1 | 10/2011 | Prince | |
| 2011/0270751 A1 | 11/2011 | Csinger et al. | |
| 2011/0296514 A1 | 12/2011 | Koennecke | |
| 2012/0072975 A1* | 3/2012 | Labrador et al. | 726/6 |
| 2012/0191525 A1* | 7/2012 | Singh et al. | 705/14.33 |
| 2012/0271702 A1* | 10/2012 | MacLachlan et al. | 705/14.26 |

OTHER PUBLICATIONS

Google Association, Associate Email Addresses with your Google Account, Jan. 2008, Retrieved from the Internet <URL:blogoscoped.com/archive/2008-01-20-n36.html>, pp. 1-2 as printed.

* cited by examiner

| |
|---|
| Please select your business' FEIDN: |
| Please select the number of years your business has been in operation: |
| Please select the state where your business was incorporated: |
| Please select the date your business filed with the Secretary of State: |
| Please select the name of an individual below who is an executive of your company: |
| Please select the name of an individual below who is a director of your company: |
| Please select the name of an individual below who is an officer of your company: |
| Please select the name of city where your business' headquarters is located: |
| Please select the number of employees at your business: |
| Please select your business' DUNS number: |

Figure 3

SINGLE SYSTEM FOR AUTHENTICATING ENTITIES ACROSS DIFFERENT THIRD PARTY PLATFORMS

CLAIM OF BENEFIT TO RELATED APPLICATIONS

This application (i) claims the benefit of U.S. provisional application 61/785,152 entitled "Single System for Authenticating Entities Across Different Third Party Platforms", filed Mar. 14, 2013, (ii) is a continuation-in-part of U.S. non-provisional application Ser. No. 13/290,731 entitled "Automated Entity Verification", filed Nov. 7, 2011 which claims the benefit of provisional application 61/505,738 entitled "Automated Entity Verification", filed Jul. 8, 2011, and (iii) is a continuation-in-part of U.S. non-provisional application Ser. No. 13/290,746 entitled "Automated Entity Verification", filed Nov. 7, 2011 which also claims the benefit of provisional application 61/505,738. The contents of applications 61/785,152, Ser. No. 13/290,731, 61/505,738, and Ser. No. 13/290,746 are hereby incorporated by reference.

TECHNICAL FIELD

The present invention pertains to identity verification and authentication.

BACKGROUND

Today, a majority of accounts registered with online service providers are not authenticated. Any entity can access an online service provider site and create an account thereon based on whatever information is provided by the entity. The provided information can accurately represent who the entity is when the entity registrant is truthful during account registration. However, the provided information can also be falsified such that the account appears to be registered to someone other than the true registrant. For example, anyone can create a Facebook® account claiming to be a celebrity, politician, or other prominent figurehead and then begin disseminating information on behalf of that entity. In other words, it is relatively easy to hijack the account of another, provide falsified information that misleads others, or commit fraud.

For these reasons, there is a push to authenticate entities online. Different online service providers have tried various authentication methodologies. However, some of these methodologies fail to curb fraud and falsified account registration because the information used for the authentication is obtained from a source that is itself subject to fraud or falsified information. For instance, some online service providers rely on linking a registered account with another existing account at another service provider. For example, in order to create an account at a first online service provider, a registrant may be required to provide an address for an email account that is registered with a second online service provider. The first online service provider then sends an activation email to the email account and the account is only activated when the registrant invokes a link in the activation email or returns a verification code from the activation email to authenticate that the registrant has access to the email account. This methodology does little to prevent fraudulent registration of accounts as the linked account can be falsified just as easy as the account being registered.

Some online service providers store confidential information about an entity as part of an account registered by that entity. The confidential information is then used to generate a series of challenge questions that are presented to an entity claiming to have forgotten or lost a username, password, or other access credentials to the registered account. While this methodology prevents others from accessing an account of another once that account has been registered, the methodology does little to prevent an entity from creating a fake account or from registering an account that hijacks the identity of another. Also, the provided information is typically limited such that only a few challenge questions can be generated. With such a small set of challenge questions, a perpetrator can discover the right answer by guessing or by obtaining the answers from other sources.

Some online service providers perform their own independent authentication. The independent authentication can occur by way of a telephone contact or by requiring the registrant to submit identification information that confirms the information used in registering an account with the online service provider. While effective, this methodology is expensive to deploy in terms of cost and time. Many potential registrants may be dissuaded by the extra effort needed to submit the supplemental authenticating information and may therefore look to competing online service providers that provide a simpler registration process.

Accordingly, there is need to provide effective, comprehensive, and unobtrusive authentication for entities registering or using unauthenticated accounts at different online service providers. There is a need for the registration to occur using verified information without the inconvenience of acquiring the verified information from the registrant whenever the registrant attempts to register a new account. Accordingly, there is a need to provide a single system with which to authenticate an entity across different platforms of various online service providers.

SUMMARY OF THE INVENTION

Some embodiments provide an independent authentication system for authenticating entities that have registered accounts across different online service providers on behalf of the online service providers. The authentication system communicably couples to multiple online service providers and provides an interface with which any online service provider can request to authenticate any entity that has registered or is attempting to register an account with that online service provider. Entities are then authenticated on behalf of the online service providers using a database of previously verified entity information.

Advantages of the authentication system include allowing the online service providers to register accounts without having to store confidential information about the registering entities and without having to develop and maintain an independent database of verified information for each registered entity. Instead, the authentication system maintains one such database for use by any of the communicably coupled online service providers and in some embodiments, the verified information within the database is not exposed to the online service providers. Additionally, the online service providers can authenticate an entity without any prior knowledge of that entity by relying on the verified information maintained by the authentication system. Also, the authentication system provides a central system that can track which accounts of a particular entity are successfully authenticated and which accounts have failed authentication. Using this information, the authentication system can notify an entity of potentially hijacked accounts or accounts that have been registered in its name without its authorization or knowledge. When operating as the central system, the authentication system can also ensure the accuracy and consistency of information about the entity that is presented across different online service providers where the entity has been authenticated. In some such embodiments, the authentication system monitors any change that occurs with respect to information about a particular entity at an online service provider that has authenticated the particular entity and the authentication system then propagates those changes to other online service providers that have authenticated the particular entity using the authentication system.

To conduct entity authentication, an online service provider submits basic identification information about the unauthenticated entity to the authentication system over the provided interface. The basic identification information can include a name, street address, telephone number, email address, or some combination thereof as some examples. Using the basic identification information, the authentication system identifies an entity record from the database of previously verified entity information.

When the basic identification information matches to the previously verified information in the entity record by a requisite amount, the authentication system parses the entity record to generate a series of challenge questions based on other verified information about the entity that is stored to the entity record. Due to the quantity of verified information in the entity record, the challenge questions can be different for each authentication iteration. The authentication system passes the challenge questions over the interface to the online service provider which then presents the challenge questions to the unauthenticated entity. The entity provides his or her answers to the challenge questions. The answers are communicated from the online service provider to the authentication system. The authentication system verifies the answers. If the provided answers match to the verified information in the entity record by a certain degree, the authentication system authenticates the entity and notifies the online service provider accordingly.

When the entity record does not match to the previously verified entity information by the requisite amount, the authentication system may request additional identifying information about the entity from the online service provider. If no additional identifying information is provided, the authentication system can perform an alternate authentication. In some embodiments, the alternate authentication involves receiving documentation or photographic evidence with geolocation information from the unauthenticated entity. The authentication system then determines whether the geolocation information coincides with a discoverable address for the entity and confirms that the received evidence further coincides with other discoverable information for the entity, wherein the discoverable information can be obtained from the entity's own website or other sites containing information about the entity.

In some embodiments, the authentication system enables an ecommerce site to issue codes for use by a targeted demographic, wherein the codes can be redeemed for discounts, offers, or other benefits. Specifically, the ecommerce site specifies one or more eligibility requirements that qualify which entities can use the code. When an entity transacts with the ecommerce site and attempts to use the code for a good or service offered by the ecommerce site, the ecommerce site sends the entity's identifying information and the eligibility requirements to the authentication system. The authentication system retrieves the entity record for the entity from the database. The authentication system then determines if the entity satisfies the eligibility requirements based on the previously verified information contained within the entity record. When the entity does not satisfy the eligibility requirements, the authentication system notifies the ecommerce site that the entity cannot redeem the discount, offer, or benefit provided by the code. When the entity does satisfy the eligibility requirements, the authentication system then attempts to authenticate the entity to ensure that the entity is who he claims to be and is not falsely representing himself as another in order to meet the eligibility requirements. To do so, the authentication system generates a series of challenge questions that are presented to the entity. When the entity successfully answers some number of the challenge questions, the authentication system notifies the ecommerce site that the entity is approved to use the code. Otherwise, the authentication system notifies the ecommerce site that the entity is denied from using the code.

In some embodiments, the authentication system acts as a central repository for coupon codes and other promotions that an entity is eligible for. In some such embodiments, ecommerce partners upload their codes and promotions in conjunction with the eligibility requirements to the authentication system. The authentication system then identifies which codes and promotions different entities are eligible for upon authenticating those entities. The eligible codes and promotions are stored to a "passport" that an entity can access at any time.

BRIEF DESCRIPTION OF THE DRAWINGS

In order to achieve a better understanding of the nature of the present invention a preferred embodiment of the authentication system will now be described, by way of example only, with reference to the accompanying drawings in which:

FIG. 3 presents a series of challenge questions that can be used to authenticate a business entity and that are derived from an entity record for that business entity in accordance with some embodiments.

FIG. 10 presents a process in accordance with some embodiments for enabling the authentication system to serve as a central repository for promotions and coupon codes that various entities are eligible for.

DETAILED DESCRIPTION OF THE INVENTION

In the following detailed description, numerous details, examples, and embodiments of an authentication system are set forth and described. As one skilled in the art would understand in light of the present description, the authentication system is not limited to the embodiments set forth, and the authentication system may be practiced without some of the specific details and examples discussed. Also, reference is made to the accompanying figures, which illustrate specific embodiments in which the authentication system can be practiced. It is to be understood that other embodiments can be used and structural changes can be made without departing from the scope of the embodiments herein described.

To facilitate the discussion that is to follow, an entity is defined to include individuals (i.e., persons) and businesses, wherein a business can be represented by its agents or representatives. An online service provider includes any website operator that requires some form of registration by entities seeking access to goods or services offered by that online service provider. Social media websites, such as Facebook, Twitter®, and Google+™, are examples of online service providers that stand to benefit the most from the services of the authentication system of some embodiments. However, e-commerce websites and informational websites (e.g., blogs) are examples of some other online service providers that stand to similarly benefit from the authentication system services. Registration can include creation of an account or profile with the online service provider. Moreover, in creating the account or profile, the registrant provides basic identification information. The basic identification information is associated with the registered account or profile and can be used in identifying the account or profile. In some embodiments, the basic identifying information includes a username, actual name of the entity, and email address as some examples. The basic identification information can also include other information, such as a telephone number or street address.

Figure 1:
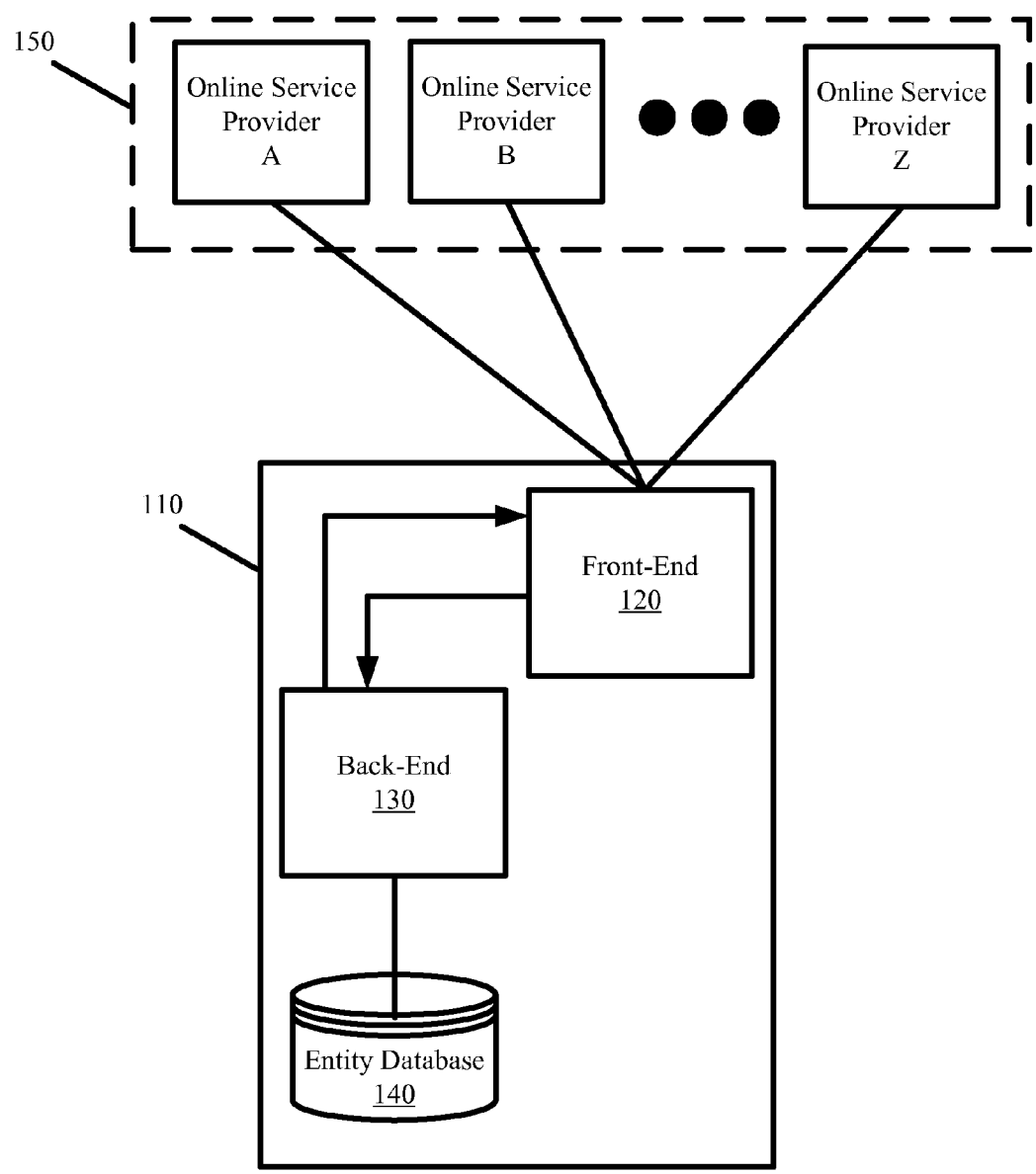
FIG. 1 illustrates components of the authentication system and an operating environment for the authentication system in accordance with some embodiments.

FIG. 1 illustrates components of the authentication system 110 and an operating environment for the authentication system 110 in accordance with some embodiments. As shown, the authentication system 110 is comprised of front-end 120, back-end 130, and database 140. The operating environment includes a plurality of online service providers 150 that are communicably coupled to the authentication system 110 and access services of the authentication system 110 through the front-end 120. Each online service provider 150 provides some good or service through an online interface to users that are registered with that online service provider.

In some embodiments, the front-end 120, back-end 130, and database 140 are hosted on one or more physical servers or virtual servers (running on special purposed hardware devices) that collectively form the authentication system 110. The servers may be collocated or dispersed across different geographic regions. In any configuration, the authentication system 110 servers are separate and distinct from the online service provider servers. In other words, the authentication system 110 is operated independent of any online service provider.

Each authentication system 110 server includes at least a non-transitory computer-readable medium and one or more processors. The non-transitory computer-readable medium stores a computer program for execution by the processors. Each server further includes a network interface for communicating with other servers of the authentication system 110, the database 140, and the plurality of online service providers 150. Additional components of each server are provided with reference to FIG. 11 below. Each of the front-end 120 and back-end 130 are components that execute on the server resources. These components 120 and 130 transform the servers and their general computing resources into specialized machines with particularized functionality for performing entity authentication in accordance with the embodiments presented herein.

In some embodiments, the front-end 120 provides an application programming interface (API) that is exposed to the plurality of online service providers 150 via a network interface. The API exposes a set of function calls and messaging constructs with which the plurality of online service providers 150 communicate with the authentication system 110. Specifically, the front-end 120 exposes the functionality with which the online service providers 150 request entity authentication and submit responses to challenge questions posed by the authentication system 110. Additionally, the front-end 120 provides the interface from which the challenge questions and authentication messages are communicated to the online service providers 150. Communication over the network interface can be conducted using Internet Protocol (IP) based messaging or any other network messaging protocols.

In some embodiments, the back-end 130 is the component of the authentication system 110 authenticating entities using the verified information contained within the database 140. Generally, the back-end 130 identifies entity records from the database 140 that pertain to different unauthenticated entities, parses verified information from the entity records to generate challenge questions, and processes entity responses to ascertain whether to authenticate those entities.

The database 140 stores entity records with each entity record containing previously verified information about a particular entity. The database 140 can be maintained by the authentication system 110 or can be maintained by another who provides the authentication system 110 access to the entity records. The information within the entity records can be verified using a variety of means. For example, verified information can be obtained from government records, bank records, and billing records. Information can also be verified via telephone conversations conducted with the entity. In some embodiments, the authentication system 110 is provided access to verified entity databases of third parties which contain several million records with each record containing verified information about a particular business entity. The authentication system 110 leverages the extensive pool of verified information within the database 140 to provide authentication services for the different online service providers. In so doing, the online service providers can authenticate entities without the need to collect, manage, and store verified information about the entities and without the need to each derive independent forms of authentication.

Figure 2:
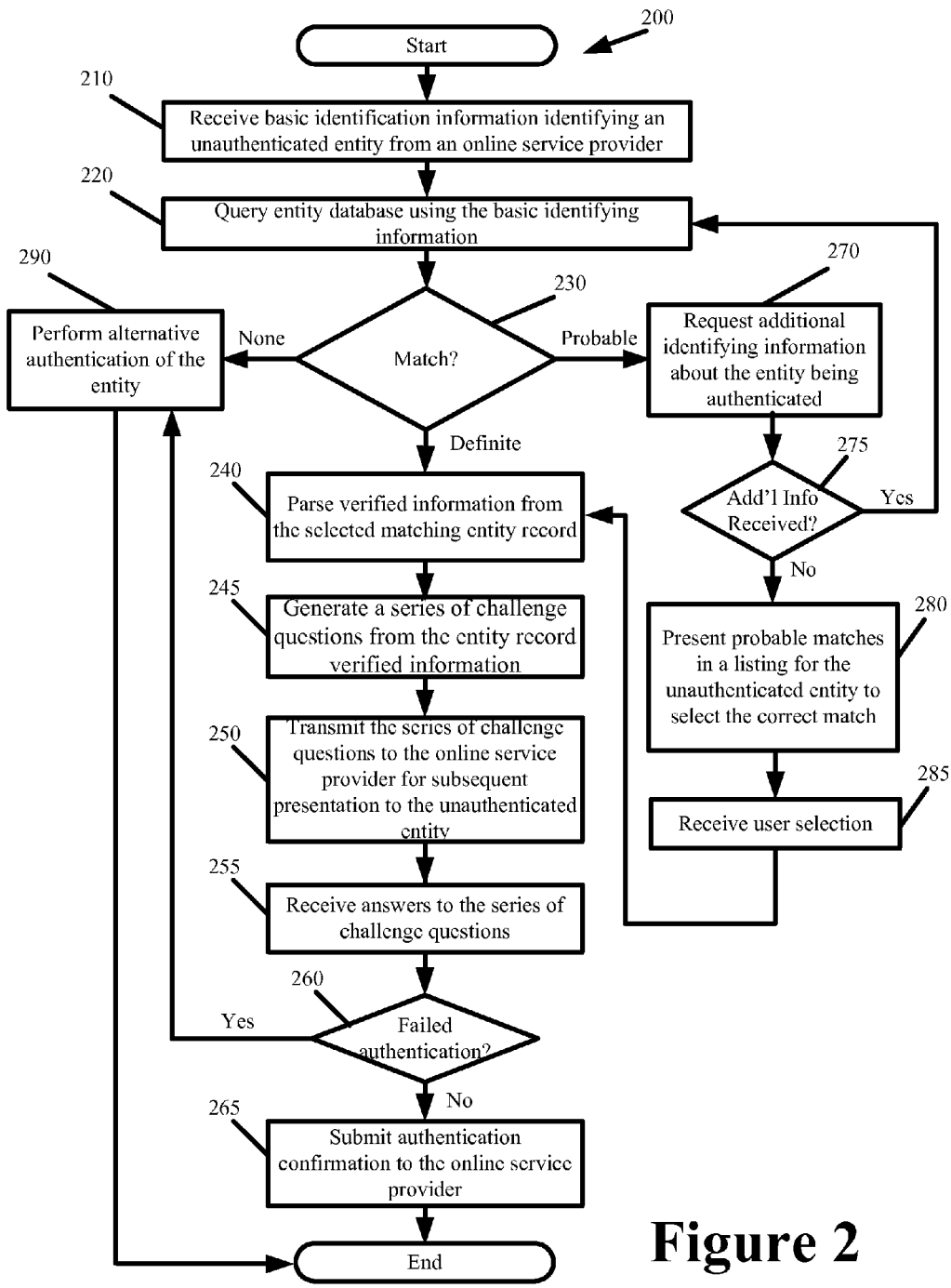
FIG. 2 presents a process performed by the authentication system for authenticating entities in accordance with some embodiments.

FIG. 2 presents a process 200 performed by the authentication system for authenticating entities in accordance with some embodiments. The process commences when the authentication system receives (at 210) from an online service provider, basic identification information identifying an unauthenticated entity. The basic identification information includes the identifying information that the online service provider acquires from the unauthenticated entity when the entity registers for an account with the online service provider. Typically, the basic identification information includes a username, an actual name, and/or an email address of the entity. However, other information such as a street address, telephone number, and URL to the entity's website can also be included as part of the basic identification information. The basic identification information does not include various confidential information of the entity, such as schooling history, income level, occupation, etc. for an individual as some examples and years in operation, number of employees, number of locations, etc. for a business as some examples.

Process 200 is not limited to accounts that are undergoing registration. Process 200 can also be applied to authenticate entities that have previously registered accounts with the online service provider. In such cases, the basic identification information will already be associated with the previously registered account and the online service provider forwards the information to the authentication system. The basic identifying information is encapsulated in a datagram that is formatted according to the front-end API specifications.

The process queries (at 220) the entity database using the basic identifying information. The query identifies any entity records from the database that contain some percentage of the basic identifying information. The greater the overlap between information in an entity record and the basic identification information received from the online service provider, the higher the probability that the entity record is a match for the unauthenticated entity.

The process next determines (at 230) whether a definite, probable, or no match is made between the verified information contained within an entity record and the basic identifying information that is obtained from the unauthenticated entity. In some embodiments, a definite match is made when there are three or more matching core data elements between the verified information in an entity record and the basic identifying information. The core data elements can include any combination of name, address, telephone number, email address, etc. In some embodiments, a probable match is made when there are at least two matching core data elements between the verified information in an entity record and the basic identifying information. If no definite or probable match can be made, the process determines that there is no match.

When a definite match is made, the process parses (at 240) the verified information from the definite matching entity record. The process generates (at 245) a series of challenge questions from the entity record verified information. Each challenge question can be formatted as an open ended question or as a multiple choice question in which the actual answer is intermixed with a set of incorrect answers. The challenge questions are randomly selected from the large pool of verified information recorded in the entity record. The series of challenge questions ask the unauthenticated entity to confirm various verified information that is ordinarily confidential and contained within the entity record. FIG. 3 presents a series of challenge questions that can be used to authenticate a business entity and that are derived from an entity record for that business entity in accordance with some embodiments.

The process transmits (at 250) the series of challenge questions to the online service provider for subsequent presentation to the unauthenticated entity. The series of challenge questions can be submitted together with the online service provider presenting one question and withholding the next question in the series until an answer is provided or with the online service provider presenting the series of challenge questions in a single online interface. Alternatively, the process can transmit a single question to the online service provider and await a response before transmitting the next question to the online service provider. The online service provider can present the challenge questions in an email to the unauthenticated entity or via an online interface, such as the interface used by the entity to register an account with the online service provider.

The process receives (at 255) answers to the series of challenge questions. The process then determines (at 260) whether to authenticate the entity based on the received answers. The process authenticates the entity when a sufficient number of the received answers are correct and confirm verified confidential information within the entity record. When authenticated, the process submits (at 265) an authentication confirmation to the online service provider. The online service provider can then indicate that the entity is authenticated by providing an authentication badge or other identifier in conjunction with the account of the entity. Otherwise, the process performs (at 290) an alternative authentication of the entity.

When one or more probable matching entity records are identified as a result of the query performed at 220, the process requests (at 270) additional identifying information about the entity being authenticated. If the additional information is provided (at 275), the process reverts to step 220 and queries the database using the newly acquired information. Otherwise, the process presents (at 280) the probable matches in a listing for the unauthenticated entity to select the correct match. The listing may include presenting a name and an address or other identifying information from each entity record that is a probable match. Once a user selection is received (at 285), the proceeds to step 240 where the entity record for the user selection is parsed in order to generate the series of challenge questions.

Figure 4:
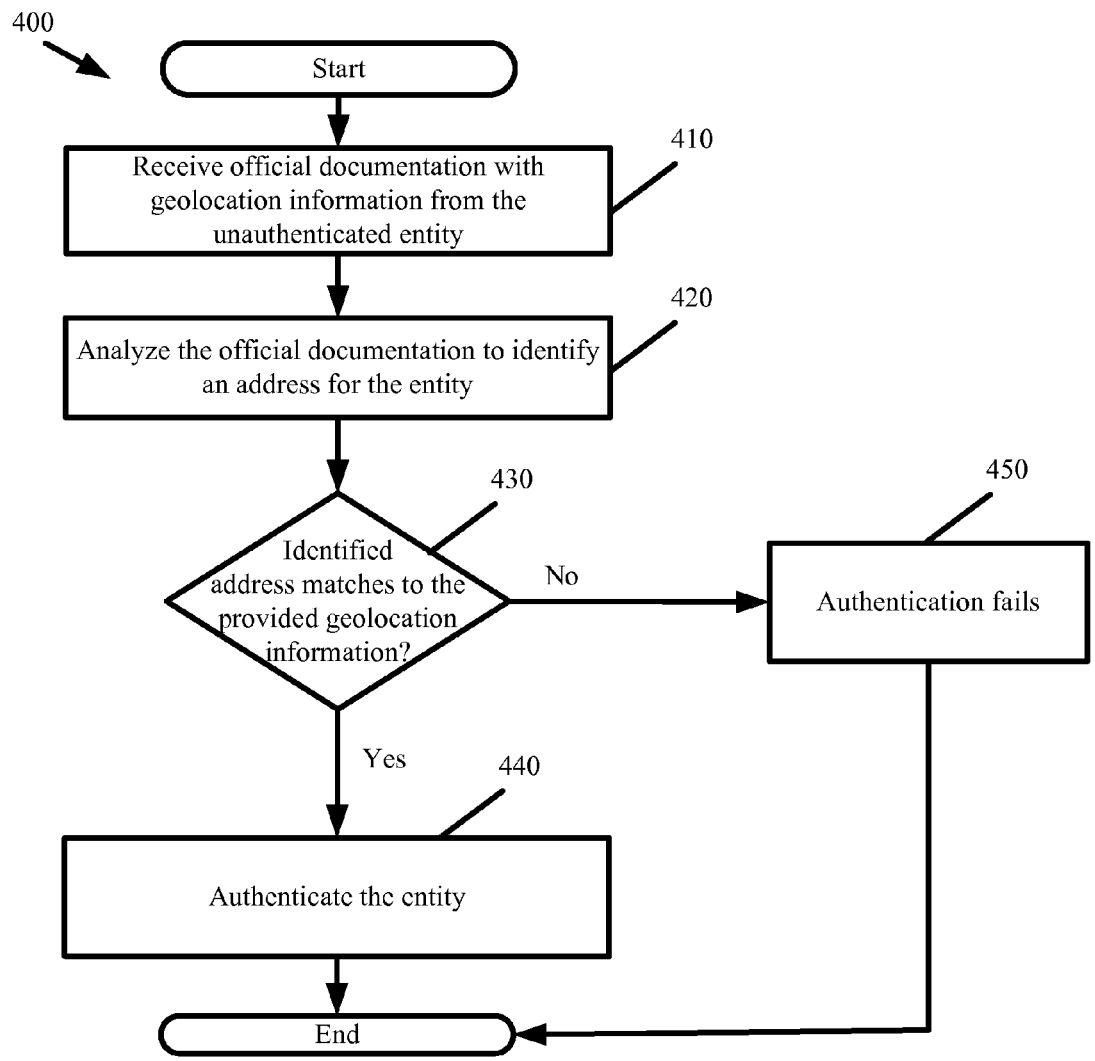
FIG. 4 presents a process for performing alternative authentication in accordance with some embodiments.

When no match is made, the process performs (at 290) an alternative authentication of the entity. FIG. 4 presents a process 400 for performing alternative authentication in accordance with some embodiments.

The process 400 commences upon receiving (at 410) official documentation with geolocation information from the unauthenticated entity. Suitable official documentation includes (1) documentation that is issued by a trusted or official source and (2) documentation that contains information identifying the unauthenticated entity and a location of the unauthenticated entity or information from which the identity and location of the unauthenticated entity can be discovered. For example, the location can be a street address or a landline telephone number that can be tracked to a street address. The official documentation is a critical first component for the alternative authentication, because access to the document is restricted to the entity that is identified in the document. Examples of official documentation acceptable for the alternative authentication include a driver's license, utility bill, or credit card statement. Each of these documents specifies an entity name and a location for the entity. These documents represent official documents, because each is issued from a trusted or official source that has previously verified the informational contents therein with the unauthorized entity. For instance, a credit card is issued to an entity that has a valid social security number and the credit card statement is issued to an address at which the entity resides or the entity has access to. The official documentation can be submitted as an image or scan of the actual document. The geolocation information identifies a location from where the official document is transmitted. Smartphones, tablets, and other global positioning satellite (GPS) enabled devices can embed the geolocation information with the transmission of the official documentation.

Next, the process analyzes (at 420) the official documentation to identify an address for the entity. The address can be discoverable from the official documentation itself. For example, an address for the entity can be extracted from a digital copy of the entity's driver's license. Additionally, the address can be discoverable from querying the entity database using other information appearing in the official documentation. For example, the name and telephone number of the unauthenticated entity can be obtained from the official documentation and used to query the database in order to discover an address that is associated with the name and telephone number.

The process compares (at 430) the identified address with the provided geolocation information. If the two match, the entity is authenticated (at 440). In some embodiments, the alternative authentication confirms that the unauthenticated entity has access to an address associated with the official documentation. More specifically, if the geolocation information establishes that the entity has access to a particular office building and the official document establishes the entity at that particular office building, then the process can authenticate the entity. Otherwise, the authentication fails (at 450) and other alternative authentication can be attempted if desired.

In some embodiments, the alternative authentication involves the authentication system receiving official documentation that contains at least a name of the entity being authenticated and a verifiable method of contacting that entity. The verifiable method of contacting the entity can include a telephone number. Therefore, when the entity submits the official documentation using a smartphone or other network enabled device having the specified telephone number, the authentication system can verify that the entity submitting the official documentation is in fact the entity identified in the official documentation. Other means of performing the alternative authentication include voice verification via a telephone call or in person verification by visiting the entity. These alternative authentication procedures conform to well established verification practices of some credit rating companies.

Another supported method of alternative authentication is performing authentication based on geolocation information that is determined from the Internet Protocol (IP) address of the machine with which an entity attempts authentication. For example, a business entity may be authenticated using a machine within the business entity's network, wherein the authentication system can verify whether the machine's IP address matches to one or more IP addresses associated with the business entity. In some such embodiments, the authentication system maintains a mapping of IP addresses to various entities (e.g., enterprises or other business entities). The mapping of IP addresses to the entities can be constructed over time based on prior entity authentications. For example, a first employee of a business entity may be authenticated from a machine within the business entity's network. The authentication system can store the IP address used by the first employee and use that IP address (or IP subnet) as a basis for authenticating other employees of that same business entity by determining whether the other employees attempt authentication from machines having the same or similar IP address.

For individual or small business entities, the authentication system will likely be unable to store the IP address that is allocated to each such entity. In such cases, the authentication system will instead map the entity's IP address to a geographic region. The geographic region is then compared against a regional identifier within the record of verified information for the entity to determine whether the entity should be allowed to continue the authentication. For example, when an entity attempts authentication using an IP address that is mapped to a geographic region in China and the record of verified information obtained for that entity reveals that the entity resides or operates in Japan, the authentication system can deny the authentication attempt. The geographic region information obtained from the IP addressing can be more granular than per country. For instance, IP addresses can be used to identify entity location to states or cities. Accordingly, when an entity is known to reside or operate in Los Angeles, but the authentication attempt comes from an IP address in San Francisco, the authentication system can deny the authentication attempt.

Still another supported method of alternative authentication includes authenticating entities using verified information provided by a transaction partner of the authentication system. For example, an online service provider may acquire credit card payment information from an unverified entity. The online service provider provides that payment information to a credit card payment processor. When the credit card payment processor is a partner of the authentication system, the authentication system may obtain a verified billing address for the unverified entity from the credit card payment processor. Using the verified billing address, the authentication system can then authenticate the unverified entity by requesting the entity to provide the billing address or a statement demonstrating the billing address to ensure the addressing matches.

Thusfar, the authentication system has been described with reference to single entity authentication. However, some entities have a parent-child organization, whereby the child entities act or operate on behalf of the parent entity. This is often the case for a business entity, wherein the business is the parent entity and the agents or representatives of that business (e.g., employees, executives, directors, principals, etc.) are the child entities. In such cases, it may be necessary to authenticate the child entities of the parent entity and associate the child entities to the parent entity.

As one example, LinkedIn (www.linkedin.com) is an online service provider that includes businesses as parent entities and individuals (i.e., employees) associated with those businesses as child entities. Yet, anyone can create an account for any business without any authentication as to whether or not that account actually represents the business. Furthermore, anyone can create employee accounts and list themselves as employees or child entities of a business without any authentication. By leveraging the authentication system, such an online service provider could authenticate the parent entity by ensuring that only someone with in-depth knowledge about the business can create the parent entity, thereby preventing others from falsely or fraudulently creating the parent entity. Moreover, the authentication system can prevent false or fraudulent child entities from being associated with that parent entity by also authenticating the employees to in fact be child entities of the parent entity.

In some embodiments, authenticating a child entity for a parent entity is a two stage process. The first stage involves authenticating the child entity to be who it claims to be. The second stage involves authenticating that the child entity is an authorized representative or agent of the parent entity.

In some embodiments, the first stage involves generating a first series of challenge questions that are directed to the child entity. The challenge questions can be derived from verified information in an entity record of the child entity.

In some embodiments, the second stage involves generating a second series of challenge questions that are directed to the parent entity, wherein these challenge questions are derived from verified information obtained for the parent entity from the database. The second series of challenge questions are then presented to the child entity. The second stage can also be completed using one of the above described alternative authentication methods. For example, the child entity can be authenticated for a parent entity when the child entity performs the authentication using a machine having an IP address that can be mapped to the parent entity.

When the two-stage authentication is completed, the child entity can be assigned a role under the parent entity. The role can be an identifier as to the child entity's function under the parent entity. Alternatively, the role can specify certain rights or permissions available to the child entity when acting on behalf of the parent entity.

To simplify the authentication of child entities, some embodiments designate one or more entities in the parent-child organization as an "ambassador". Once the ambassador is authenticated and associated with the particular parent entity, the ambassador can act as an internal authentication source for the particular parent entity. In its role, the ambassador can provide the authentication system with a list of child entities that are then automatically authenticated for the particular parent entity. Alternatively, the ambassador can provide the names of the child entities and the child entities still have to perform one stage of the two-stage authentication process in order to be included as child entities of the specified parent entity. In any case, the ambassador can prepopulate the authentication system with a list of known child entities.

The ambassador is typically an authoritative figure associated with the parent entity. For example, the ambassador may be the CEO or other executive associated with the parent entity. In some embodiments, the ambassador is whoever authenticates the parent entity, wherein the authentication may be initiated in response to registering an account for the parent entity at an online service provider that leverages services of the authentication system.

Figure 5:
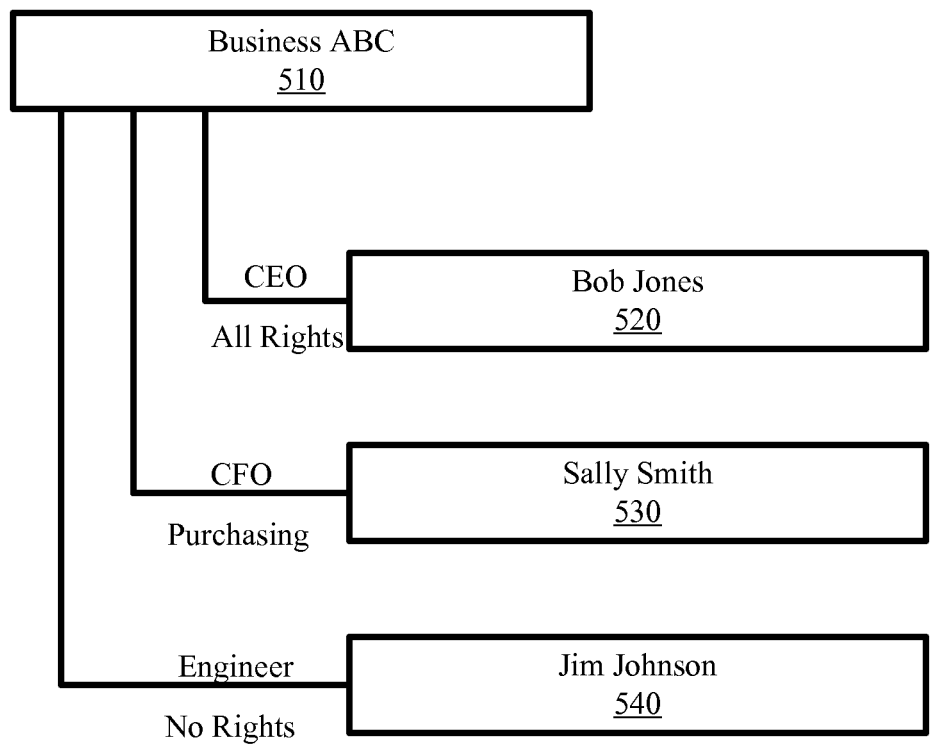
FIG. 5 conceptually illustrates a parent entity identifying a business and child entities that are agents or representatives of the parent entity.

FIG. 5 conceptually illustrates a parent entity 510 identifying a business and child entities 520, 530, and 540 that are agents or representatives of the parent entity 510. Each child entity is assigned a role identifying the function of the child entity and rights for the child entity to act or operate on behalf of the parent entity 510. For example, child entity 520 is identified as the CEO and has all rights, whereas child entity 530 is identified as the CFO and is restricted to purchasing rights when acting or operating on behalf of the parent entity 510. The parent-child organization can also be leveraged for targeted marketing purposes as will be discussed below.

The authentication system provides several advantages to authentication methodologies currently available in the prior art. First, the authentication system is a shared solution in which any online service provider can authenticate its users by simply requesting the authentication service from the authentication system. Consequently, authentication can be conducted on behalf of an online service provider without the online service provider having any prior knowledge or information about the entity being verified. The online service provider can instead rely on the database maintained by the authentication system for the previously verified information that is needed to complete the authentication. This frees the online service provider from having to collect, manage, and store confidential information about the entity and also frees the online service provider from having to independently verify the collected information. The database compiled by the authentication system of some embodiments is comprehensive, allowing different challenge questions to be presented whenever the authentication procedure is restarted for the same entity at the same or different online service provider.

Some embodiments provide universal access credentials to an entity once that entity is authenticated with a first online service provider. The universal access credentials can then be used to login or automatically create an account for the entity at other online service providers that partner with the authentication system without the entity having to re-specify the basic identifying information or other information when registering with other online service providers.

When the entity provides the universal login credentials to an online service provider partner, the partner will first determine whether the access credentials log the entity into an account that is registered with that online service provider partner. If not, the partner then provides the access credentials to the authentication system. The authentication system then determines whether or not the entity has been previously authenticated. If not, the entity is prevented from accessing services of the online service provider partner. Otherwise, the authentication system provides authenticated information back to the online service provider partner. The information can be used to automatically create and populate an account for the entity at the online service provider partner. Alternatively, the information can be used to identify the entity and its authentication status to the online service provider partner and the entity can then continue accessing goods and services of the partner through an authenticated guest account.

Figure 6:
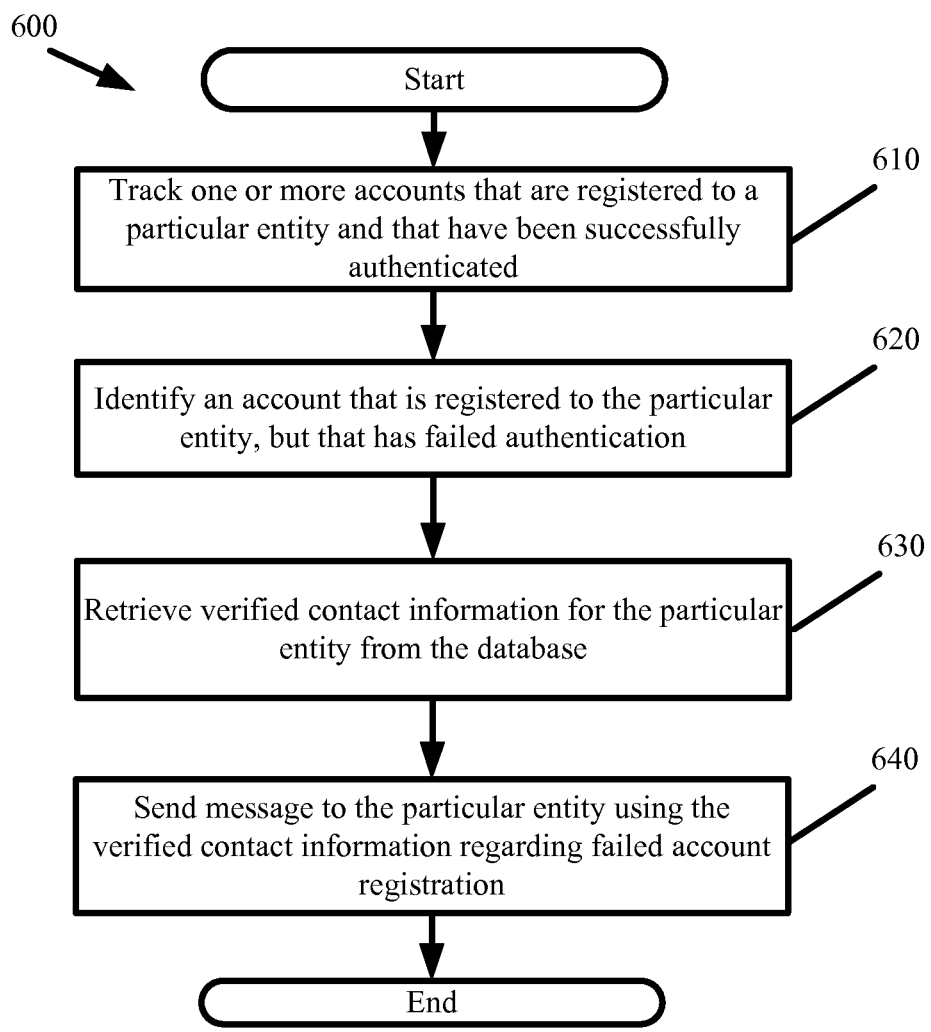
FIG. 6 presents a process for notifying entities of potentially fraudulently registered or hijacked accounts in accordance with some embodiments.

In some embodiments, the shared solution offered by the authentication system is leveraged to notify an authenticated entity of accounts fraudulently registered to the entity or that have been hijacked. FIG. 6 presents a process 600 for notifying entities of potentially fraudulently registered or hijacked accounts in accordance with some embodiments.

Process 600 commences by tracking (at 610) one or more accounts that are registered to a particular entity and that have been successfully authenticated by way of process 200 above or a similar process that is performed by the authentication system. Specifically, whenever an online service provider requests authentication for an account that is registered to the particular entity, the authentication system records the registration and successful authentication of the account at the online service provider to the database.

Next, the process identifies (at 620) an account that is registered to the particular entity, but that has failed authentication. The failed authentication can be indicative of another that is attempting to register and use an account representing the particular entity. Accordingly, the process retrieves (at 630) verified contact information for the particular entity from the database. The verified contact information is stored as part of the entity record containing verified information of the particular entity. The verified contact information can include any of an email address, street address, telephone number, chat username, or social media username as some examples. The process then sends (at 640) a message to the particular entity using the verified contact information, wherein the message notifies the particular entity of a failed authentication attempt with an identifier identifying the account that failed the authentication and the online service provider at which the account is registered.

Once the particular entity is made aware of the failed authentication attempt, the particular entity can confirm that he/she was responsible for the failed authentication attempt and therefore discard the notification. Alternatively, the notification can serve to identify a previously unknown account that is registered to the particular entity. The particular entity can then claim the account for itself or contact the online service provider to deregister the account on the premise that the account was fraudulently registered in the name of the particular entity without the particular entity's knowledge or consent.

Such functionality is unavailable when the online service providers independently perform their own authentication. In such scenarios, there is no single system that tracks the accounts of a particular entity that are successfully and unsuccessfully authenticated. As such, the particular entity cannot be made aware of accounts that are registered in the name of the particular entity without the consent of the particular entity. However, the authentication system of some embodiments offers a shared solution that any online service provider can use. A byproduct of this shared solution is that the authentication system can track the status of multiple accounts registered to a particular entity across various online service providers. In so doing, the authentication system can notify the particular entity when an authentication attempt on an account of the particular entity fails. This allows the particular entity to take action, if needed, to prevent others from falsely representing themselves as the particular entity online.

This functionality can also be used to monitor the online presence of an entity across different online service providers. When the entity is authenticated with a first online service provider and with a second online service provider, the authentication system becomes aware of the accounts registered by the entity at the first and second online service providers. The authentication system can then monitor those accounts looking for any changes that occur to one account, but not the other. In such cases, the authentication system can then propagate the change across the other accounts registered at the other online service providers, thereby ensuring that information about the entity presented on the online service providers is kept up-to-date and is consistent across the online service providers. In some embodiments, an online service provider may query the authentication system for any monitored changes to a particular entity's account at other online service providers and the authentication system can provide any detected changes to the online service provider for it to use in updating the particular entity's account registered thereon.

The shared authentication service provided by the authentication system of some embodiments also has application for online marketers and sites involved in some form of ecommerce, whether in the sale of a good or service. To attract repeat customers or new customers, these ecommerce sites distribute online coupon codes that can be redeemed for a discount on the goods or services that are offered by the ecommerce sites. Others distribute offers or other benefits in the form of a code that can be redeemed for upgrades, free trials, free gifts, alternate goods and services, etc.

Though these codes are effective in attracting clientele, they are usually ineffective in attracting the right clientele. Once a code for a discount, offer, or other benefit is made available to any one entity, that entity can redistribute the same code for others to use. In fact, several websites exist for this purpose of collecting online codes and making these codes available for others to use. These codes therefore attract bargain hunters. Bargain hunters merely look to capitalize on a onetime deal with no intention to buy other goods or to return as a repeat customer.

Instead, the ecommerce site would prefer to attract its primary demographic of customers which includes those entities that are interested in other goods and services offered by the ecommerce site besides the discounted or promotional goods and services. The primary demographic is also more likely to revisit and purchase other goods and services without a discount, offer, or other benefit inducing that purchase.

Ecommerce sites are limited in their ability to combat the undesired effects of online code marketing. They can attempt to tie the use of a code to a specific customer account such that only one particular customer can use that code. However, this restricts the marketing effort only to preexisting customers or those customers that have registered an account with the ecommerce site. Using this solution, the ecommerce site will be unable to disseminate codes to potential customers that have not yet registered with the ecommerce site.

The authentication system provides various solutions to this and other related issues by allowing the ecommerce sites the ability to perform a marketing campaign that is restricted to customers that meet the eligibility requirements defined by the ecommerce site for the marketing campaign.

Figure 7:
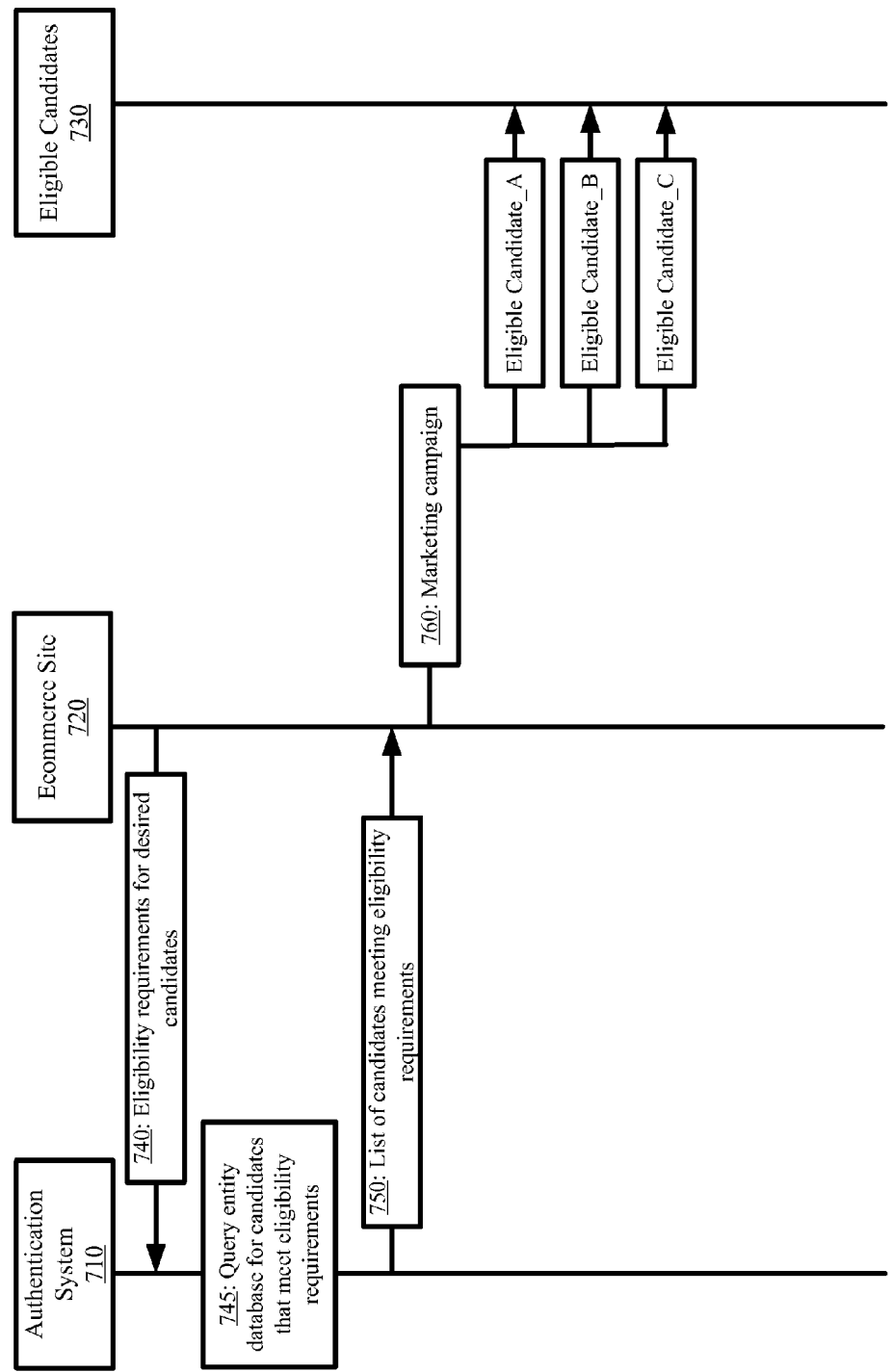
FIG. 7 presents a message exchange by which the authentication system of some embodiments pre-screens candidates that meet eligibility requirements specified by an ecommerce site or other online marketer.

In some embodiments, the authentication system provides an ecommerce site or other marketer a pre-screened list of candidates that meet eligibility requirements specified by the ecommerce site or other marketer. The ecommerce site can then perform a targeted marketing campaign to the pre-screened list of candidates knowing that the candidates meet eligibility requirements that the ecommerce site has identified for its primary demographic of customers. FIG. 7 presents a message exchange by which the authentication system 710 of some embodiments pre-screens candidates 730 that meet eligibility requirements specified by an ecommerce site 720 or other online marketer.

The message exchange commences by the ecommerce site 720 providing (at 740) the authentication system 710 with a list of eligibility requirements for a desired set of candidates that the ecommerce site 720 wishes to market to. The ecommerce site 720 can identify its primary demographic of customers using the eligibility requirements, whether or not any of the primary demographic of customers have had any prior engagement with the ecommerce site 720.

The eligibility requirements can include any parameters that are included in the data structure for any entity record that is stored to the entity database of the authentication system. For instance, the entity data may include the number of years in operation, annual revenue, and street address as some parameters that can be specified as part of the eligibility requirements. It should be apparent to one of ordinary skill in the art that the entity database will include tens or hundreds of such parameters per entity record. The ecommerce site 720 can mix and match any of these parameters when specifying the eligibility requirements. The eligibility requirements may be specified using a graphical interface that is provided by the authentication system 710.

Upon receiving the eligibility requirements, the authentication system 710 then searches (at 745) the entity database in order to identify and extract a list of candidates that meet the eligibility requirements. The list of candidates is passed (at 750) to the ecommerce site 720. In some embodiments, the authentication system 710 passes complete information for each candidate in the list of candidates, including identifying information and contact information for each candidate. In some other embodiments, the authentication system 710 protects the identity or other confidences of the candidates by passing only contact information (e.g., email address, online handle, mailing address, or telephone address) of the candidates to the ecommerce site 720 such that the ecommerce site 720 is never provided the names or other identifying information of the candidates.

The ecommerce site 720 then performs (at 760) a targeted marketing campaign to the identified listing of candidates, wherein the identified listing of candidates includes entities that the ecommerce site 720 has identified as desired candidates (e.g., primary demographic of customers). This leads to a more effective marketing campaign and better conversion rates for the ecommerce site 720. The marketing campaign can include providing a coupon code that any of receiving candidates can use to discount any goods and services purchased from the ecommerce site 720. The marketing campaign can also include providing promotional materials, informational materials, other benefits, or offers to the pre-screened listing of candidates. The marketing campaign can be performed by emailing, physical mailing, instant messaging, online messaging, or telephone contacting the candidates with the code, promotion, etc.

While the process presented through the message exchange of FIG. 7 provides the ecommerce site with a pre-screened listing of candidates that meet eligibility requirements and allows the ecommerce site to perform a targeted marketing campaign, the recipients can nevertheless circumvent the intentions of the ecommerce site by forwarding the marketing campaigns to others or by publishing the marketing campaigns online for anyone to see. The authentication system of some embodiments can combat such behavior by restricting the marketing campaign only to those candidates that were designated to receive the marketing campaign as a result of meeting the eligibility requirements of the ecommerce site.

In some embodiments, the authentication system tracks an identity for each eligible candidate that it provides to the ecommerce site. When a customer then attempts to redeem a discount, offer, or other benefit with the ecommerce site using a code or by other means, the ecommerce site can provide the identity of the customer to the authentication system. The customer's identity is obtained from a shipping address or payment information that is provided by the customer. The authentication system then notifies the ecommerce site whether that customer was one of the eligible candidates that should be allowed to redeem the discount, offer, or other benefit.

Alternatively, when providing the list of eligible candidates to the ecommerce site, the authentication system may additionally provide one item of identifying information for each eligible candidate. The ecommerce site can then verify usage of an online code by comparing the identifying information provided by the customer using the online code against the identifying information provided by the authentication system for the eligible candidates. In such scenarios, the authentication system can still hide the identity of the eligible candidates from the ecommerce site by providing only partial identifying information, such as a street number rather than an entire address or the last four digits of a telephone number rather than an entire telephone number.

Figure 8:
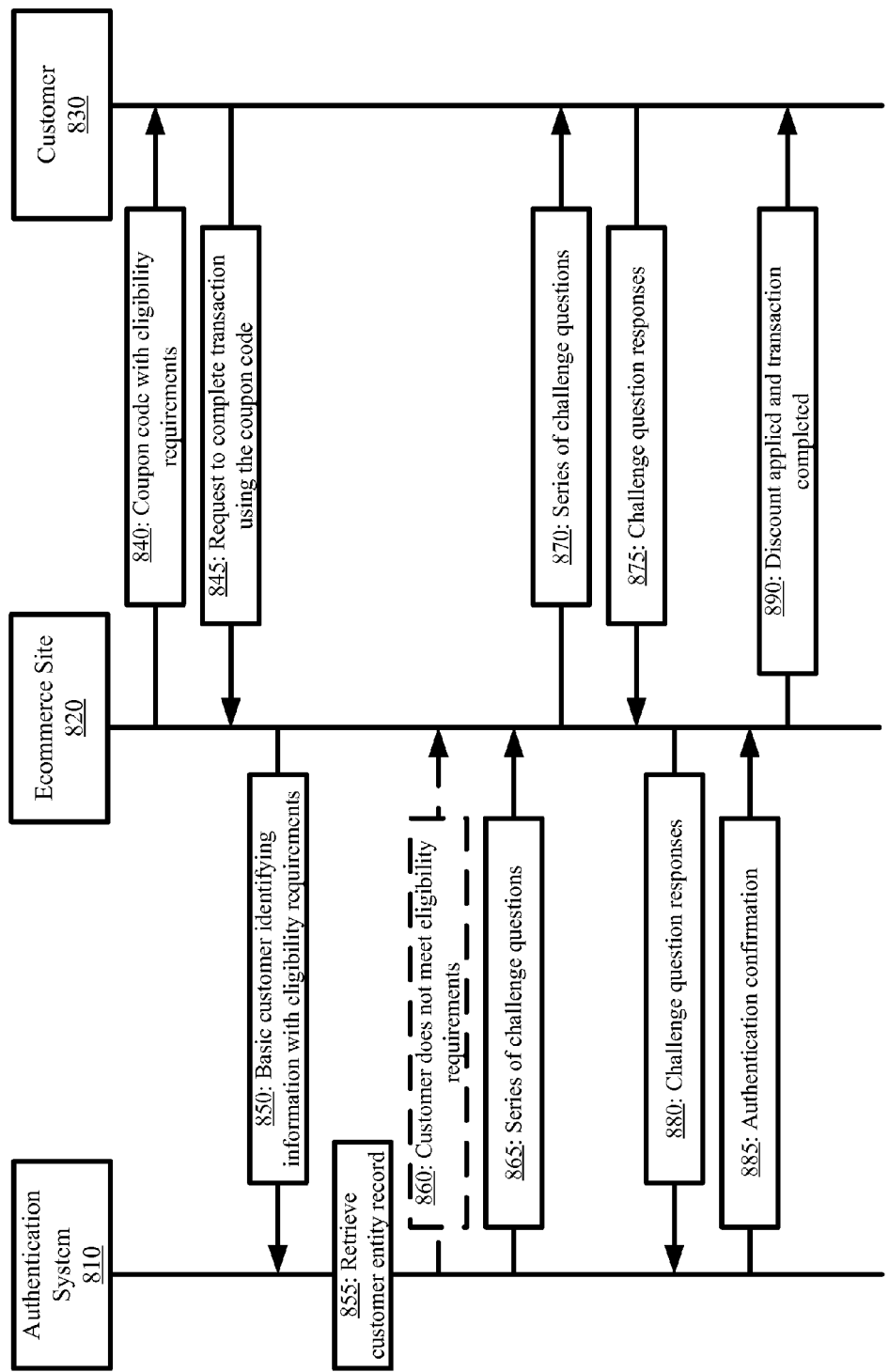
FIG. 8 presents an alternate message exchange by which the authentication system post-screens candidates that are eligible to redeem a discount, offer, or other benefit disseminated by an ecommerce site or other third party marketer in accordance with some embodiments.

FIG. 8 presents an alternate message exchange by which the authentication system post-screens candidates in order to determine if the candidates are eligible to redeem a discount, offer, or other benefit disseminated by an ecommerce site or other third party marketer in accordance with some embodiments. The figure illustrates the messages that are exchanged between the authentication system 810 of some embodiments, ecommerce site 820, and customer 830.

The exchange begins with the ecommerce site 820 performing a marketing campaign. In this figure, the marketing campaign involves disseminating (at 840) a coupon code with various eligibility requirements specified for redeeming the coupon code. For example, a coupon code may recite "small businesses in Los Angeles with less than 100 employees can receive a 10% discount by entering coupon code 'SMB'". Unlike the pre-screened methodology above, the ecommerce site 820 does not disseminate the coupon code with the eligibility requirements to a pre-screened list of candidates that are known to be eligible to redeem the discount offered by the coupon code. Instead, the ecommerce site 820 publicly disseminates the coupon code or disseminates the code to potential customers without knowing whether the potential customers are eligible to redeem the discount associated with the coupon code. In other words, in this scenario, the ecommerce site 820 is unconcerned with who the recipients of the marketing campaign are. Instead, the ecommerce site 820 desires that the marketing campaign reach the broadest audience possible. In some embodiments, the ecommerce site 820 directly disseminates the coupon code to customer 830 and other entities by emailing the coupon code with the eligibility requirements. In some other embodiments, the ecommerce site 820 indirectly disseminates the coupon code to customer 830 and other entities by posting the coupon code and the eligibility requirements to a publicly accessible site where it is freely accessible to anyone with Internet access.

The ecommerce site 820 partners with the authentication system 810 and relies upon the authentication service of the authentication system 810 to ensure that entities attempting to redeem the disseminated coupon code meet the eligibility requirements that are specified for the coupon code. Accordingly, when customer 830 attempts to complete (at 845) a purchase from the ecommerce site 820 using the disseminated coupon code, the ecommerce site 820 passes (at 850) basic identifying information about the customer 830 to the authentication system 810. The basic identifying information can include information that the customer 830 provides the ecommerce site 820 when registering an account with the ecommerce site 820. Alternatively, the basic identifying information can include the billing information or shipping information that the customer 830 provides to complete the purchase. In some embodiments, the ecommerce site 820 additionally relays the eligibility requirements specified for the coupon code to the authentication system 810.

Using the basic identifying information, the authentication system 810 retrieves (at 855) an entity record from the database that contains previously verified information about the customer 830. As before, the authentication system 810 can make a definite or probable match of the entity record using the basic identifying information. When the probable match is made, the set of probable matching entity records are presented to the customer 830 for selection of the correct entity record.

The authentication system 810 then determines if the previously verified information in the entity record for the customer 830 satisfies the eligibility requirements specified for the coupon code. If not, the authentication system 810 notifies (shown as optional step 860) the ecommerce site 820 that the customer 830 does not meet the eligibility requirements. On the other hand, when the customer 830 satisfies the eligibility requirements, the authentication system 810 next authenticates the customer 830 to ensure that the customer 830 is who he claims to be and is not falsely representing himself as another in order to meet the eligibility requirements.

To authenticate the customer 830, the authentication system 810 generates a series of challenge questions from the previously verified information within the entity record and passes (at 865) the series of challenge questions to the ecommerce site 820. The ecommerce site 820 presents (at 870) the series of challenge questions to the customer 830, receives (at 875) the customer's responses to the challenge questions, and submits (at 880) the responses to the authentication system 810. The authentication system 810 then attempts to authenticate the customer 830 based on whether the customer 830 provided responses that match with the previously verified information in the entity record.

When the customer 830 fails the authentication as a result of incorrectly answering some number of the series of challenge questions, the ecommerce site 820 will not apply (not shown) the coupon code discount to the customer's transaction. When the customer 830 is properly authenticated, as a result of correctly answering some number of the series of challenge questions, the ecommerce site 820 applies the coupon code discount to the customer's transaction.

In this figure, the customer 830 correctly answers the required number of challenge questions. Accordingly, the authentication system 810 notifies (at 885) the ecommerce site 820 that the customer 830 has been authenticated and that the customer 830 satisfies the eligibility requirements that have been specified for using the code. In turn, the ecommerce site applies (at 890) the coupon code discount to the transaction of the customer 830.

In some embodiments, the customer 830 may login to the ecommerce site 820 using the universal access credentials described above. In such instances, the ecommerce site 820 forwards the universal access credentials to the authentication system 810 instead of the basic identifying information. Using the universal access credentials, the authentication system 810 retrieves the proper entity record. The authentication system 810 then determines whether or not the entity meets the eligibility requirements specified for the code based on the verified information from within the entity record. Additionally, the entity logging in with the universal access credentials can avoid having to answer challenge questions when redeeming a code, because the universal access credentials result from a prior successful authentication of an entity.

It should be noted that in some embodiments, the challenge question authentication is optional. In other words, should the entity record for the customer 830 confirm the customer's 830 eligibility to redeem the coupon code discount, the authentication system 810 notifies the ecommerce site 820 to apply the discount at that stage in the message exchange.

Besides redeeming a discount by way of a coupon code, the various pre-screening and post-screening methodologies described above can be adapted for any marketing campaign that provides other offers or benefits to the eligible customers. These offers or benefits can include free trial memberships, bonus gifts, offers to services of another, informational materials, service upgrades, etc., wherein such offers or benefits are redeemable using an online code. The online code can be any of a numeric, alphanumeric, or symbolic code. Additionally, the online code can be a graphic, image, bar code, or QR code that can be submitted to the ecommerce site.

In addition to or besides the specification of eligibility requirements, some embodiments allow the marketing campaigns to be targeted based on a child entity's role under a parent entity. As was noted above, when entities are authenticated in a parent-child organization, the child entities can be provided a role under the parent entity. For example, a first set of child entities can be authenticated as managers of a parent entity and a second set of child entities can be authenticated as engineers of the parent entity. Continuing with the example, an online marketing campaign can be specified to apply to the first set of child entities, but not the second set of child entities. The child entity roles can be combined with any other eligibility requirements specified using the verified information from the entity records of the database.

Along similar lines, the authentication system can identify the linkages between a parent and its children by retrieving traversing the entity record linkages for each. For example, an ecommerce site may perform a marketing campaign, whereby the ecommerce site disseminates coupon code "SMB" that is redeemable for a 10% discount by any employee of a local corporation that has existed less than 5 years with revenue less than 10 million. When a customer attempts to redeem the coupon code with the ecommerce site, the ecommerce site will pass the customer's basic identifying information to the authentication system. The authentication system will then pull the customer's entity record from the entity database. From the customer's entity record, the authentication system identifies the customer's employer. Next, the authentication system pulls the entity record for the employer. From the employer's entity record, the authentication system can verify whether the customer meets the eligibility requirements specified for the coupon code as result of being an employee of a local corporation that has existed less than 5 years with revenue less than 10 million. Should the customer meet the eligibility requirements, the authentication system notifies the ecommerce site or alternatively performs the challenge question authentication to verify the customer's identity.

In these manners, the authentication system allows online marketers and ecommerce sites the ability to perform targeted online marketing campaigns. More specifically, the authentication system allows the online marketers and ecommerce sites to do so without the online marketers and ecommerce sites having to identify the entities that fall within the targeted demographic. In other words, they can define the eligibility requirements and/or child entity roles, distribute the coupon codes, offers, or benefits with the eligibility requirements, and then rely on the authentication services of the authentication system to filter the entities that attempt to redeem the code, offer, or benefit in order to determine which ones meet the eligibility requirements and which ones do not. Moreover, the online marketers and ecommerce sites are able to perform the targeted marketing campaign without having to independently manage and maintain the verified information that is needed to authenticate the entities responding to the marketing campaign. As such, the authentication system of some embodiments can act as back-end and offer this solution to any number of front-end ecommerce sites, online marketers, or other goods/service providers.

As a variant of the pre-screening methodology above, the authentication system can also serve as a lead generation platform for its various marketing and ecommerce partners. In some such embodiments, the partners submit their marketing campaigns (e.g., coupon codes, promotional materials, incentives, etc.) to the authentication system. The authentication system then selectively disseminates those marketing campaigns to entities that meet the eligibility requirements when those entities are authenticated by the authentication system on behalf of another marketing and ecommerce partner.

Figure 9:
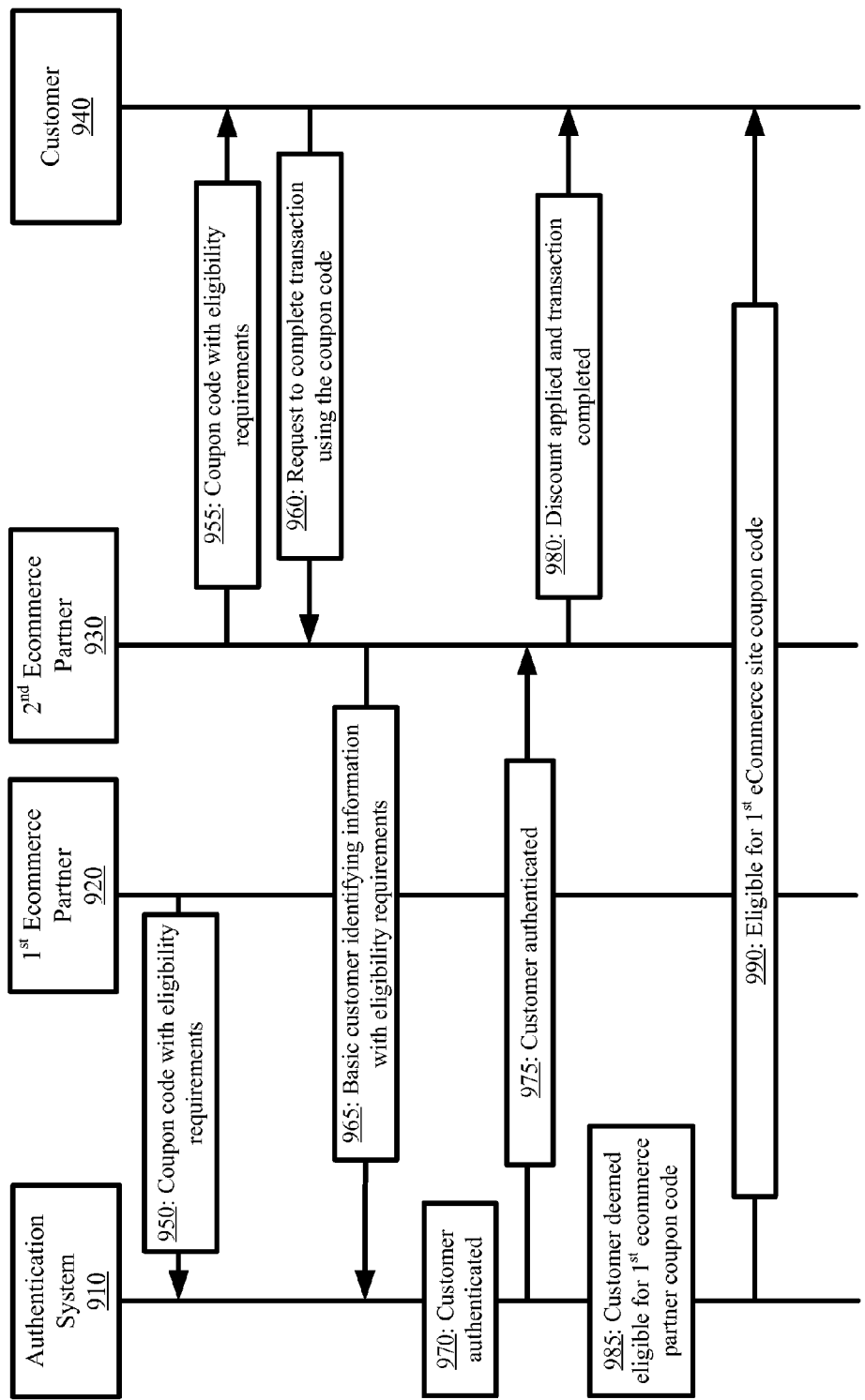
FIG. 9 illustrates leveraging the authentication system as a lead generation platform in accordance with some embodiments.

FIG. 9 illustrates leveraging the authentication system as a lead generation platform in accordance with some embodiments. The figure illustrates the authentication system 910 of some embodiments, a first ecommerce partner 920, a second ecommerce partner 930, and customer 940.

The first ecommerce partner 920 uploads (at 950) its marketing campaign to the authentication system 910. The marketing campaign includes a coupon code with eligibility requirements.

The second ecommerce partner 930 disseminates (at 955) its own marketing campaign comprising of a coupon code and eligibility requirements to the customer 940. In response, the customer 940 engages (at 960) the second ecommerce partner 930 in a transaction with the desire to use the coupon code. To authenticate that the customer 940 meets the eligibility requirements specified by the second ecommerce partner 930, the second ecommerce partner 930 utilizes the authentication services of the authentication system 910. The second ecommerce partner 930 provides (at 965) basic identifying information about the customer 940 to the authentication system 910 along with the eligibility requirements. The authentication system 910 then authenticates (at 970) the customer 940 based on the previously verified information that is stored in the customer's entity record. The authentication system notifies (at 975) the second ecommerce partner 930 that the customer 940 is authenticated and meets the eligibility requirements and the second ecommerce partner 930 applies (at 980) the coupon code discount to the customer's transaction.

The authentication system 910 also queries the marketing campaigns uploaded by the first ecommerce partner 920 and other partners to determine if the customer 940 is eligible for any other coupon codes, promotions, incentives, etc. specified as part of those other marketing campaigns. Using the previously verified information in the customer's entity record, the authentication system 910 determines (at 985) that the customer 940 is also eligible for the promotions of the first ecommerce partner 920.

As shown in the message exchange of FIG. 9, the authentication system 910 notifies (at 990) the customer 940 that it is also eligible for the coupon code of the first ecommerce partner 920. In some other embodiments, the authentication system 910 notifies the first ecommerce partner 920 that the customer 940 is eligible for its offered promotions. More specifically, the authentication system 910 may provide the customer's contact information (e.g., email, telephone, address, etc.) to the first ecommerce partner 920 so that the first ecommerce partner 920 can disseminate its marketing promotion to the eligible customer 940. In still some other embodiments, the authentication system 910 notifies the second ecommerce partner 930 that the customer 940 is eligible for the promotions of the first ecommerce partner 920. More specifically, the authentication system 910 provides the second ecommerce partner 930 with the coupon code of the first ecommerce partner 920 so that the second ecommerce partner 930 can offer the coupon code or other promotion to the customer 940.

Figure 10:
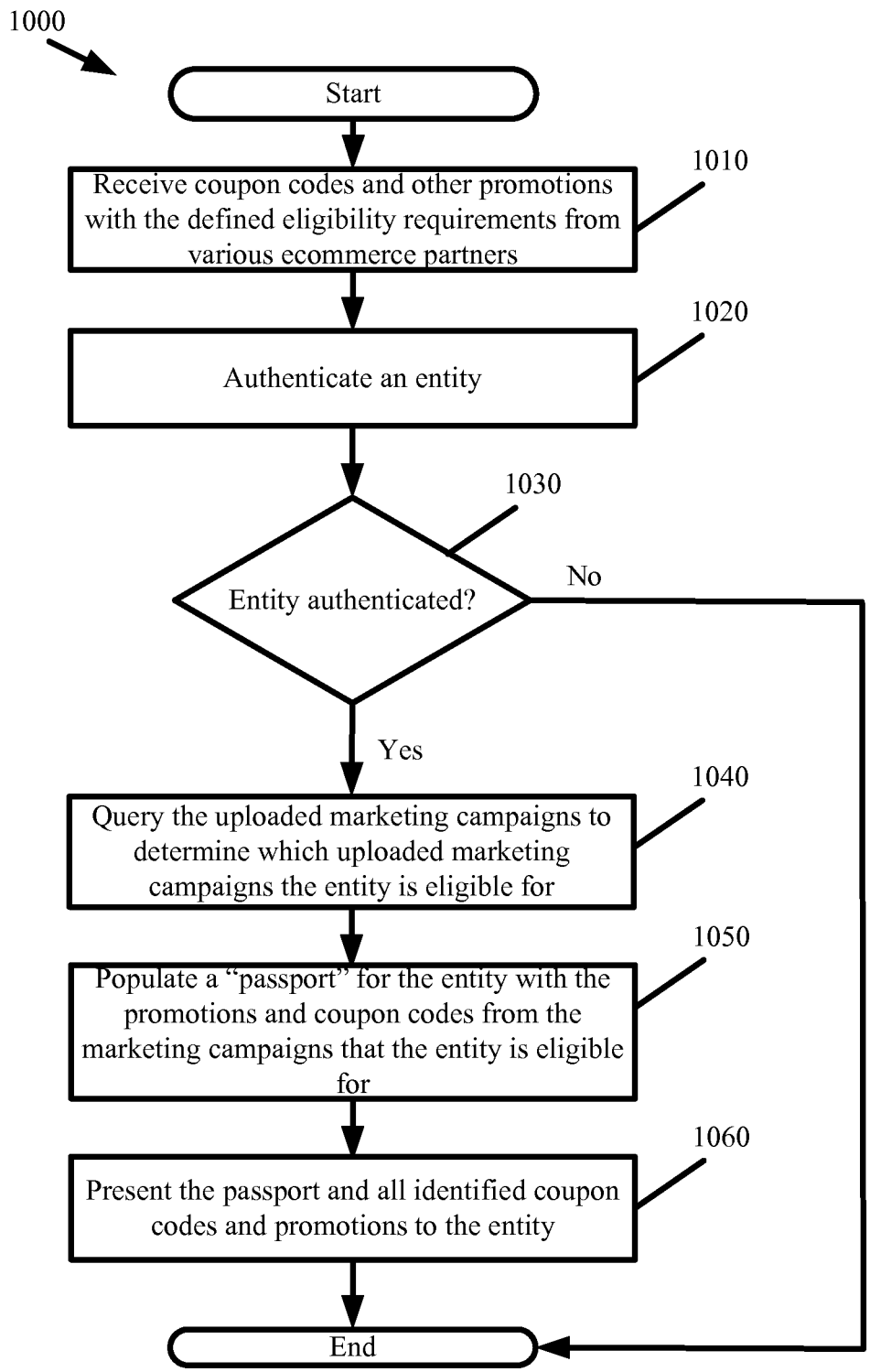

The authentication system may also serve as a central repository for all promotions and coupon codes that an entity is eligible for. FIG. 10 presents a process 1000 in accordance with some embodiments for enabling the authentication system to serve as a central repository for promotions and coupon codes that various entities are eligible for.

The process 1000 commences when the authentication system receives (at 1010) coupon codes and other promotions with the defined eligibility requirements (i.e., marketing campaigns) from various ecommerce partners. The authentication system stores these uploaded campaigns to the database.

Next, the process authenticates (at 1020) an entity that wishes to access any coupon codes and other promotions it is eligible for. The authentication system authenticates the entity in the manner described above with reference to FIG. 2.

The process determines (at 1030) whether the entity is properly authenticated. When the entity cannot be authenticated, the process ends and the entity is not deemed eligible for any of the uploaded marketing campaigns. When the entity is authenticated, the process queries (at 1040) the uploaded marketing campaigns using the verified information obtained from the entity record for the authenticated entity to determine which uploaded marketing campaigns the entity is eligible for. The process then creates a "passport" for the entity and populates (at 1050) the passport with the promotions and coupon codes from the marketing campaigns that the entity is eligible for. The passport is a profile or other data record that is created within the authentication system database. The passport is continually updated to link to whatever uploaded marketing campaigns the entity is eligible for.

The process presents (at 1060) the passport and all identified coupon codes and promotions to the entity when the entity accesses the passport using a set of access credentials. The set of access credentials can include a username and password combination. The entity can access the passport from any network enabled device by directing the device, web browser, or application thereon to a passport login interface of the authentication system. In this manner, the entity is made aware of the discounts and promotions that it is eligible for without the entity having to actively search for and find these discounts and promotions.

In some such embodiments, the authentication system provides a shared authentication service to benefit online service providers, online marketers, and ecommerce partners while also benefiting the entities that it authenticates by providing those entities with the passport that stores the coupon codes and other promotions that the entity is deemed eligible for. The entities no longer need to actively search different sites for those promotions nor do the entities need to be spammed with those promotions. Instead, whenever they choose to look for a promotion, the entities access their passport and all promotions that they are eligible for are listed therein. Also, marketers and ecommerce partners can conduct more effective marketing campaigns that target their primary demographic without even needing to know who the entities that fall within that primary demographic are.

Many of the above-described processes and components are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Computer and computer system are meant in their broadest sense, and can include any electronic device with a processor including cellular telephones, smartphones, portable digital assistants, tablet devices, laptops, and servers. Examples of computer-readable media include, but are not limited to, CD-ROMs, flash drives, RAM chips, hard drives, EPROMs, etc.

Figure 11:
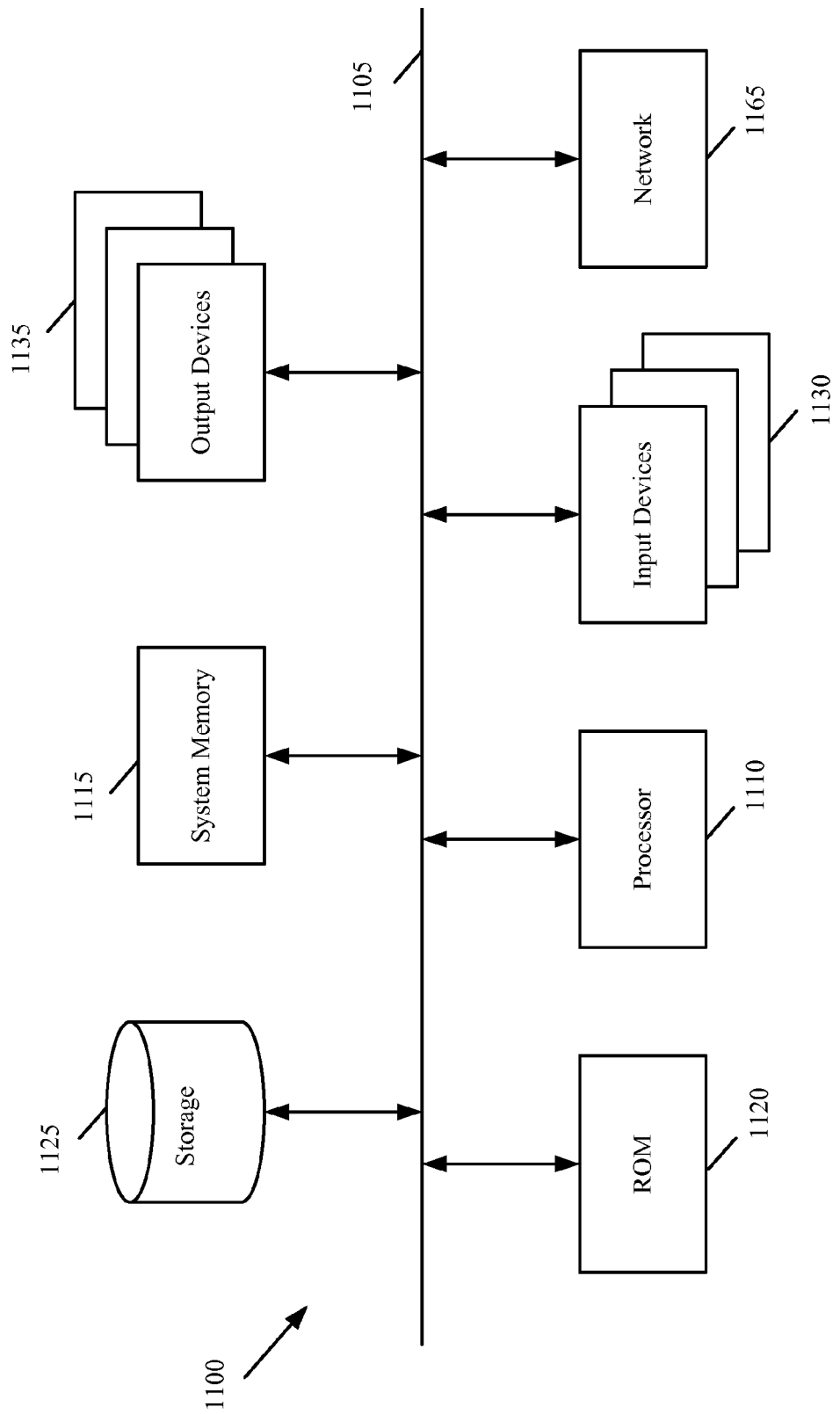
FIG. 11 illustrates a computer system with which some embodiments are implemented.

FIG. 11 illustrates a computer system with which some embodiments are implemented. Such a computer system includes various types of computer-readable mediums and interfaces for various other types of computer-readable mediums that implement the various processes, modules, and engines described above for the authentication system. Computer system 1100 includes a bus 1105, a processor 1110, a system memory 1115, a read-only memory 1120, a permanent storage device 1125, input devices 1130, and output devices 1135.

The bus 1105 collectively represents all system, peripheral, and chipset buses that communicatively connect the numerous internal devices of the computer system 1100. For instance, the bus 1105 communicatively connects the processor 1110 with the read-only memory 1120, the system memory 1115, and the permanent storage device 1125. From these various memory units, the processor 1110 retrieves instructions to execute and data to process in order to execute the processes of the invention. The processor 1110 is a processing device such as a central processing unit, integrated circuit, graphical processing unit, etc.

The read-only-memory (ROM) 1120 stores static data and instructions that are needed by the processor 1110 and other modules of the computer system. The permanent storage device 1125, on the other hand, is a read-and-write memory device. This device is a non-volatile memory unit that stores instructions and data even when the computer system 1100 is off. Some embodiments of the invention use a mass-storage device (such as a magnetic or optical disk and its corresponding disk drive) as the permanent storage device 1125.

Other embodiments use a removable storage device (such as a flash drive) as the permanent storage device Like the permanent storage device 1125, the system memory 1115 is a read-and-write memory device. However, unlike storage device 1125, the system memory is a volatile read-and-write memory, such as random access memory (RAM). The system memory stores some of the instructions and data that the processor needs at runtime. In some embodiments, the processes are stored in the system memory 1115, the permanent storage device 1125, and/or the read-only memory 1120.

The bus 1105 also connects to the input and output devices 1130 and 1135. The input devices enable the user to communicate information and select commands to the computer system. The input devices 1130 include any of a capacitive touchscreen, resistive touchscreen, any other touchscreen technology, a trackpad that is part of the computing system 1100 or attached as a peripheral, a set of touch sensitive buttons or touch sensitive keys that are used to provide inputs to the computing system 1100, or any other touch sensing hardware that detects multiple touches and that is coupled to the computing system 1100 or is attached as a peripheral. The input device 1130 also include alphanumeric keypads (including physical keyboards and touchscreen keyboards), pointing devices (also called "cursor control devices"). The input devices 1130 also include audio input devices (e.g., microphones, MIDI musical instruments, etc.). The output devices 1135 display images generated by the computer system. The output devices include printers and display devices, such as cathode ray tubes (CRT) or liquid crystal displays (LCD).

Finally, as shown in FIG. 11, bus 1105 also couples computer 1100 to a network 1165 through a network adapter (not shown). In this manner, the computer can be a part of a network of computers (such as a local area network ("LAN"), a wide area network ("WAN"), or an Intranet, or a network of networks, such as the internet. For example, the computer 1100 may be coupled to a web server (network 1165) so that a web browser executing on the computer 1100 can interact with the web server as a user interacts with a GUI that operates in the web browser.

As mentioned above, the computer system 1100 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. For an authentication system comprising at least one server device, a computer-implemented method for authenticating entities across a plurality of online service providers, the computer-implemented method comprising:
   receiving from an online service provider of the plurality of online service providers, an authentication request for authenticating on behalf of the online service provider, whether a particular individual purchasing a good or service of the online service provider using a code is eligible to receive a promotion associated with the code, the authentication request providing identifying information used by the particular individual;
   obtaining at least one qualifying parent-child relationship from the online service provider, the qualifying parent-child relationship identifying a particular parent business entity whose child entities are eligible to receive the promotion using the code;
   querying a database using the identifying information, the database comprising a plurality of entity records, each entity record of the plurality of entity records containing previously verified information about a different individual or business;
   selecting a particular entity record from the plurality of entity records containing previously verified information for the particular individual that matches the identifying information from the authentication request;
   generating a series of challenge questions from the previously verified information of the particular entity record;
   submitting the series of challenge questions from the authentication system to the online service provider for presentation to the particular individual;
   receiving from the online service provider, a set of answers provided by the particular individual that are responsive to the series of challenge questions; and
   authenticating by the authentication system on behalf of the online service provider, eligibility of the particular individual to receive the promotion associated with the code, said authenticating comprising performing a first authentication based on the set of answers correctly answering a specified number of the series of challenge questions and performing a second authentication based on the previously verified information from the particular entity record satisfying the qualifying parent-child relationship by identifying the particular individual as a child of the particular business entity, wherein said authenticating ensues from the user providing the code as part of purchasing the good or service from the online service provider and prior to the online service provider completing sale of the good or service to the entity.

2. The computer-implemented method of claim 1, wherein the identifying information comprises a name that the particular individual uses in registering for the service of the online service provider.

3. The computer-implemented method of claim 1, wherein selecting the particular entity record comprises identifying a set of the plurality of entity records that contain some previously verified information matching to the identifying information.

4. The computer-implemented method of claim 3, wherein selecting the particular entity record further comprises presenting the set of entity records to the particular individual through an interface of the online service provider for selection of the particular entity record from the set of entity records by the particular individual.

5. The computer-implemented method of claim 1 further comprising performing an alternative authentication of the particular individual when the set of answers fail to correctly answer the specified number of the series of challenge questions.

6. The computer-implemented method of claim 5, wherein performing the alternative authentication comprises receiving official documentation from the particular individual with geolocation information identifying a location from which the official documentation is transmitted.

7. The computer-implemented method of claim 6, wherein performing the alternative authentication further comprises authenticating the particular individual when address information in the official documentation matches to the location identified from the geolocation information.

8. The computer-implemented method of claim 1, wherein the particular individual is a first individual, the computer-implemented method further comprising contacting a second individual that is different than the first individual using contact information contained within the particular entity record when authentication fails by the first individual.

9. The computer-implemented method of claim 8, wherein contacting the second individual comprises notifying the second individual that authentication has failed for an account registered in the name of the second individual at the online service provider.

10. The computer-implemented method of claim 1, wherein the authentication system provides a central authenticating authority for authenticating usage of a promotional code at each of the plurality of online service providers.

11. The computer-implemented method of claim 1 further comprising retrieving contact information from the particular entity record that does not overlap with the identifying information when the set of answers do not correctly answer a specified number of the series of challenge questions.

12. The computer-implemented method of claim 11 further comprising providing direct notification to the particular individual using the content information from the particular entity record that an authentication attempt for the particular individual at the online service provider has failed.

13. The computer-implemented method of claim 1 further comprising receiving from a second different online service provider of the plurality of online service providers, an authentication request for authenticating the same entity.

14. The computer-implemented method of claim 13 further comprising generating and issuing a different set of challenge questions from the particular entity record to authenticate usage of a second different code by the particular individual at the second different online service provider.

15. The computer-implemented method of claim 1, wherein each challenge question from the series of challenge questions is a question directed to some previously verified information of the particular entity record that does not overlap with the identifying information used by the entity in registering for the service of the online service provider.

16. For an authentication system, a computer-implemented method for authenticating entities across a plurality of online service providers, the computer-implemented method comprising:
  managing a database with a plurality of entity records, a plurality of codes, and a plurality of eligibility requirements, wherein each entity record of the plurality of entity records stores information about a different entity, wherein each code of the plurality of codes is associated with a different eligibility requirement from the plurality of eligibility requirements, and wherein the plurality of eligibility requirements specify different qualifications that the plurality of online service providers have set in order for the entities to qualify for different promotions offered by the plurality of online service providers;
  receiving (i) first registration information identifying a first entity that provides a first code in order to redeem a first promotion from a first online service provider of the plurality of online service providers and (ii) second registration information identifying a second entity that is different than the first entity and that provides a second code in order to redeem a second promotion from a second online service provider of the plurality of online service providers;
  retrieving from the database (i) a first eligibility requirement from the plurality of eligibility requirements that is associated with the first code and (ii) a second eligibility requirement from the plurality of eligibility requirements that is associated with the second code;
  retrieving from the database (i) a first entity record of the plurality of entity records storing previously verified information that is a match for the first registration information and (ii) a second entity record of the plurality of entity records storing previously verified information that is a match for the second registration information;
  generating (i) a first series of challenge questions from other previously verified information of the first entity record that is different than the first registration information and (ii) a second series of challenge questions from other previously verified information of the second entity record that is different than the second registration information;
  validating (i) usage of the first code at the first online service provider by the first entity when a specified number of responses provided by the first entity correctly answer the first series of challenge questions and when the previously verified information from the first entity record satisfies the at least first eligibility requirement and (ii) usage of the second code at the second online service provider by the second entity when a specified number of the responses provided by the second entity correctly answer the second series of challenge questions and when the previously verified information from the second entity record satisfies the at least second eligibility requirement; and
  providing notification that the first entity is eligible for a different third promotion from a third online service provider of the plurality of service providers, wherein providing the notification comprises (i) querying the plurality of eligibility requirements in the database using the previously verified information from the first entity record and (ii) identifying that the previously verified information from the first entity record satisfies at least a third eligibility requirement that the third online service provider sets for the third promotion.

17. The computer-implemented method of claim 16, wherein the first online service provider operates independent of the second online service provider and registrations with the first online service provider are unavailable to the second online service provider.

18. The computer-implemented method of claim 16 further comprising issuing (i) the first series of challenge questions to the first online service provider for presentation to the first entity through an interface hosted by the first online service provider and (ii) the second series of challenge questions to the second online service provider for presentation to the second entity through an interface hosted by the second online service provider.

19. The computer-implemented method of claim 16, wherein issuing (i) the first series of challenge questions and (ii) the second series of challenge questions comprises withholding the previously verified information of the first entity record and the previously verified information of the second entity record from the first and second online service providers.

20. The computer-implemented method of claim 16 further comprising notifying the first online service provider that the first entity has fraudulently registered with the first online service provider when a specified number of responses provided by the first entity do not correctly answer the first series of challenge questions.

21. The computer-implemented method of claim 16 further comprising notifying an entity other than the first entity using previously verified contact information of the first entity record when a specified number of responses provided by the first entity do not correctly answer the first series of challenge questions.

22. The computer-implemented method of claim 16, wherein providing the notification further comprises providing the third online service provider with contact information of the first entity and notice that the first entity is eligible for the third promotion of the third online service provider.

23. The computer-implemented method of claim 16, wherein providing the notification further comprises providing the first entity with notice that it is eligible for the third promotion of the third online service provider and with a third code for redeeming the third promotion.

24. A non-transitory computer-readable storage medium with an executable program stored thereon, wherein the program instructs a microprocessor to perform sets of instructions for:

receiving from an online service provider of the plurality of online service providers, an authentication request for authenticating on behalf of the online service provider, whether a particular individual purchasing a good or service of the online service provider using a code is eligible for an incentive associated with the code, the authentication request providing identifying information used by the entity when purchasing the good or service;

obtaining from the online service provider, at least one parent-child relationship qualifying child entities of a particular parent business entity as eligible to receive the incentive when using the code;

retrieving a particular entity record from a plurality of entity records containing previously verified information that is a match for the identifying information from the authentication request, wherein each entity record of the plurality of entity records contains previously verified information about a different individual or business;

generating a series of challenge questions from the previously verified information of the particular entity record, each challenge question from the series of challenge questions being derived from previously verified information of the particular entity record that does not overlap with the identifying information used by the particular individual in registering for the service of the online service provider;

issuing the series of challenge questions;

receiving a set of answers provided by the particular individual that are responsive to the series of challenge questions; and notifying the online service provider that the particular individual has been authenticated to receive said incentive when the set of answers correctly answer a specified number of the series of challenge questions and the previously verified information of the particular entity record satisfies the parent-child relationship by identifying the particular individual as a child of the particular business entity.

25. The non-transitory computer-readable storage medium of claim 24, wherein the program further instructs the microprocessor to perform a set of instructions for retrieving a plurality of marketing campaigns, each marketing campaign of the plurality of marketing campaigns specifying an eligibility requirement.

26. The non-transitory computer-readable storage medium of claim 25, wherein the program further instructs the microprocessor to perform a set of instructions for presenting a set of the plurality of marketing campaigns that the individual is eligible for based on the previously verified information from the particular entity record satisfying the eligibility requirement that is specified for each marketing campaign of the set of marketing campaigns.

\* \* \* \* \*